(12) United States Patent
Haenlein et al.

(10) Patent No.: US 6,920,899 B2
(45) Date of Patent: Jul. 26, 2005

(54) FLUID CONTROL VALVE

(75) Inventors: Hans-Christoph Haenlein, Cupertino, CA (US); Douglas Scott Richmond, Zionsville, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 243 days.

(21) Appl. No.: 10/400,214

(22) Filed: Mar. 27, 2003

(65) Prior Publication Data

US 2004/0231735 A1 Nov. 25, 2004

(51) Int. Cl.⁷ .............................................. F16K 11/074
(52) U.S. Cl. ............................ 137/636.3; 137/625.41; 137/625.17
(58) Field of Search ........................ 137/636.3, 636.2, 137/625.4, 625.41, 625.17

(56) References Cited

U.S. PATENT DOCUMENTS

| | | | |
|---|---|---|---|
| 2,849,548 A | 8/1958 | Young ............................ | 200/6 |
| 3,056,867 A | 10/1962 | Eitel ............................ | 200/81 |
| 3,589,242 A | 6/1971 | Peterson et al. ............... | 91/413 |
| 3,698,415 A | 10/1972 | Forster et al. ............... | 137/102 |
| 3,766,944 A | 10/1973 | Distler ...................... | 137/625.6 |

(Continued)

FOREIGN PATENT DOCUMENTS

| | | | |
|---|---|---|---|
| EP | 0 311 546 A2 | 4/1989 | ........... F16K/31/60 |
| EP | 0 855 544 A2 | 7/1998 | ........... F16K/31/60 |
| GB | 579542 | 8/1946 | |
| WO | WO 03/060621 A1 | 7/2003 | ........... G05G/9/047 |

Primary Examiner—Kevin Lee
(74) Attorney, Agent, or Firm—Woodard, Emhardt, Moriarty, McNett & Henry LLP

(57) ABSTRACT

A fluid control valve for controlling the delivery of water includes a control lever that is movable in two directions by rotation of the lever about two independent axes. The fluid control valve includes a valve body assembly with flow passageways and a housing assembly attached to the valve body assembly to define an interior space. A flow control mechanism positioned in the interior space is constructed to enable movement of the lever about a first axis for translating rotational movement into sliding motion of an upper disk against a lower disk to adjust the water temperature. Rotation of the lever in a second direction translates rotational movement into sliding motion of the upper disk in a second direction to control the water flow rate. A drag spring positioned as part of the control mechanism changes the frictional force or feel between the two directions of lever movement.

33 Claims, 7 Drawing Sheets

U.S. PATENT DOCUMENTS

| | | | |
|---|---|---|---|
| 3,952,764 A | 4/1976 | Keller, III | 137/119 |
| 3,958,601 A | 5/1976 | Schmitt | 137/636.2 |
| 4,084,611 A | 4/1978 | Mahrer | 137/454.2 |
| 4,183,377 A | 1/1980 | Bernat | 137/625.17 |
| 4,200,123 A | 4/1980 | Brandelli | 137/625.4 |
| 4,301,830 A | 11/1981 | Keller, III | 137/454.6 |
| 4,337,795 A | 7/1982 | Argyris et al. | 137/625.17 |
| 4,586,534 A | 5/1986 | McNeely | 137/515.7 |
| 4,604,502 A | 8/1986 | Thomas | 200/6 A |
| 4,605,200 A | 8/1986 | Huppee | 251/258 |
| 4,633,906 A | 1/1987 | Tuchman | 137/625.17 |
| 4,739,523 A | 4/1988 | Bondar | 4/191 |
| 4,754,783 A | 7/1988 | Knapp | 137/625.4 |
| 4,768,557 A | 9/1988 | Holzer | 137/636.2 |
| 4,782,853 A | 11/1988 | Moen | 137/454.6 |
| 4,854,347 A | 8/1989 | Knapp | 137/625.4 |
| 4,854,498 A | 8/1989 | Stayton | 236/12.12 |
| 4,932,433 A | 6/1990 | Knapp | 137/381 |
| 4,957,135 A | 9/1990 | Knapp | 137/454.6 |
| 5,100,565 A | 3/1992 | Fujiwara et al. | 251/368 |
| 5,170,816 A | 12/1992 | Schnieders | 137/556.6 |
| 5,293,900 A | 3/1994 | Karbassi et al. | 137/554 |
| 5,295,513 A | 3/1994 | Hori | 137/636.2 |
| 5,342,018 A | 8/1994 | Wu | 251/250 |
| 5,490,540 A * | 2/1996 | Vom Dahl et al. | 137/625.17 |
| 5,542,449 A | 8/1996 | Huang | 137/551 |
| 5,559,432 A | 9/1996 | Logue | 324/207.17 |
| 5,592,971 A | 1/1997 | Knapp | 137/625.41 |
| 5,692,541 A | 12/1997 | Brown | 137/636.2 |
| 5,743,297 A | 4/1998 | Mueller | 137/636.2 |
| 5,810,050 A | 9/1998 | Pickerrell et al. | 137/625.41 |
| 5,896,601 A | 4/1999 | Humpert et al. | 4/677 |
| 5,937,897 A | 8/1999 | Chatterjea et al. | 137/554 |
| 6,045,118 A | 4/2000 | Knapp | 251/231 |
| 6,050,285 A | 4/2000 | Goncze et al. | 137/98 |
| 6,131,600 A | 10/2000 | Change | 137/100 |
| 6,179,130 B1 | 1/2001 | Nguyen et al. | 210/424 |
| 6,183,636 B1 | 2/2001 | Bowers et al. | 210/232 |
| 6,271,828 B1 | 8/2001 | Rosenberg et al. | 345/156 |
| 6,298,875 B1 | 10/2001 | Warshawski et al. | 137/606 |
| 6,300,937 B1 | 10/2001 | Rosenberg | 345/156 |
| 6,325,089 B1 | 12/2001 | Breda | 137/98 |
| 6,394,133 B1 | 5/2002 | Knapp | 137/615 |
| 6,429,849 B1 | 8/2002 | An et al. | 345/161 |

* cited by examiner

FLUID CONTROL VALVE

BACKGROUND OF THE INVENTION

The present invention relates generally to fluid control valves that are constructed and arranged to control the delivery of fluid from a supply location to a use location. More specifically, the present invention relates to a water faucet control valve that is constructed and arranged to independently control the temperature of the water delivered to the use location and the flow rate of the water by a single handle or control lever or what can generally be referred to as a "joy stick", due to its appearance, construction, range of motion, and degrees of freedom.

Single-handled water faucet control valves are well known and have been offered with different mechanical arrangements for controlling the available directions of travel, the range of motion and the type or style of motion for the handle. Generally speaking, one style of control valve of the type being described includes a handle that is moved in a generally sideways (left-to-right and right-to-left) direction in order to adjust the mix of hot and cold water for the desired temperature. With this style of water faucet control valve arrangement, the handle is typically moved in an upward or forward direction, away from the user, to increase the flow rate and volume. The handle is typically moved in a downward or rearward direction, toward the user, in order to reduce the flow rate and volume or to completely shut off the flow of water out of the controlled faucet.

Single-handled control valves of the type described above can be referred to as having a joy stick control handle due to the single-handle construction and the manner in which the handle can be moved. The directions and range of motions are controlled by the internal structure of the valve mechanism and by the selection and arrangement of the component parts. Single-handled water faucet control valves that are known to exist are typically constructed with consideration given to the type of fluid to be delivered, the end use, the end user, and the circumstances that exist when the valve is actuated or opened relative to the convenience and safety of the user.

In the field of water delivery faucets, one style of single-handled control valve (referred to herein as "type one", for reference only) is configured such that there is sliding motion in a first direction and rotary motion in a second direction. With a type one style of control valve, the selected water temperature is able to be maintained as the water flow is adjusted or turned off. This is possible because the first direction of motion is "decoupled" from the second direction of motion.

Another style of single-handled control valve (referred to herein as "type two", for reference only) is configured such that the motion in a first direction and the motion in a second direction are not decoupled. This means that movement of the handle in a direction that is a vector product of the two primary directions is possible. In one specific configuration of a type two control valve, the handle returns to the center or neutral temperature position when the water flow is turned off. One embodiment of a type two style utilizes a modified ball and socket combination with a pin and slot feature to control the "return to neutral" characteristic as described above. Some of the branded DELTA®faucets, offered by Delta Faucet Company of Indiana, are designed in this manner.

The type one style involves movement of the handle in two different directions that are distinct from each other. As used herein, the term "distinct" is intended to define a control valve motion wherein movement of the handle in one direction to control or adjust one of the two water variables does not have an effect on the other water variable, and vice versa. More specifically, control valves of this style include a structure that enables rotary motion in one direction for controlling one water parameter and sliding motion in a second direction for controlling a second water parameter. Control valves of this type incorporate a front-to-back (or a back-to-front) tilting or sliding action for the ON-OFF control and rotation about a control axis for the HOT-COLD adjustment. The referenced "control" axis may be a vertical axis in certain faucet designs, and/or the Z axis depending on the faucet design, and/or the longitudinal axis of the valve body or handle. The mechanisms or arrangements that are selected for fluid control in this type or style of control valve inherently have high frictional interfaces and an effort is made in the nature of design modifications to try and reduce those frictional forces so that the control lever is able to move more easily.

There are aspects of fluid control valves that include the type one style of motion that can be improved upon. For example, the structure of this style and the mechanisms used to effect motion in the first and second directions make it progressively harder to manipulate flow temperature as the control valve approaches its full ON position. This is true due to the fact that the moment arm of the lever around the flow control axis typically decreases when the flow lever is in the ON position. It is also typically harder to control the flow rate as the temperature approaches either of the extreme positions (full hot or full cold) since the lever has usually rotated around to a less favorable position at these extremes as compared to the more optimized warm position. One benefit, however, of the type one style of motion is that this arrangement provides for a desirable decoupling of control motions for the two water flow variables, namely the water flow rate and the water temperature. These two variables can be easily controlled independently of one another by this type one style of motion.

When a fluid control valve is used for the delivery and control of water for a residential user, user convenience and safety are important. With the type one style of control valve, when the handle is moved to an "off" position, but with the water temperature position remaining elevated, the user can initially receive water at a higher temperature than desired. The type two style avoids the initial delivery of higher temperature water by returning the control lever to a temperature-neutral position when the flow of water is turned off. However, the type two style introduces a new consideration. Due to the freedom of movement of the fluid control valve and the different directions of travel, one for adjusting the water temperature and the other for adjusting the flow rate (volume), the user needs to carefully position the handle for the desired balance of both water temperature and water flow rate. For example, after the selected balance of temperature and flow rate is reached and thereafter an increased flow rate is desired, care must be taken to avoid changing the temperature as the handle is moved in order to adjust the fluid flow rate. A similar consideration exists once the desired flow rate is set and then the water temperature needs to be adjusted. While the freedom of handle movement does not present a safety concern, some potential purchasers of water faucets of this general type may prefer to be able to adjust one water parameter, temperature or flow rate, without unintentionally changing the other water parameter.

One reality of the type two style that includes a modified ball and socket is that with the ball at rest, there is static friction that influences the initial force that is required to "break" the ball free and initiate movement. Once the ball is in motion, the user feels the effect of dynamic friction and the dynamic friction is less than the static friction that had to be overcome to initiate movement. Since the type two style does not decouple the motion or travel in a first direction from the motion or travel in a second direction, once the static friction on the ball is overcome, it is difficult for the user to feel any difference in the two directions of motion or in a combination of those two directions, such as the vector product. Even if the user has selected one direction as his "preferred" direction of movement, it is difficult to sense or feel if there is any departure from the chosen path. Since the directions of motion or travel are not decoupled, breaking the ball free to initiate movement in one direction also breaks the ball free in the other direction.

After reviewing the existing fluid control valve technology, the features of interest or importance to consumers and the available products, the present inventors concluded that it would be an improvement if the benefits and advantages of single-handle controlled motion could be combined with the decoupled control of the two water flow variables, temperature and flow rate, similar to the type one style of motion. The present inventors further envisioned that the structural configuration of the fluid control valve mechanism would have two decoupled directions of handle movement about two intersecting orthogonal axes and that the frictional force in one direction of handle travel would be different from the frictional force in the other direction of handle travel.

The present inventors envisioned that by selecting a modified ball and socket configuration, the realities of static friction versus dynamic friction could be utilized. With decoupled directions of travel, once the user selects the "preferred" direction of travel and initiates motion, the static friction is overcome and changes to the lower dynamic friction. This does not affect the other direction of travel which remains in a static friction state. The result, due to the lower frictional level, is that the control handle is easier to move in the selected (i.e., preferred) direction. The control valve prefers this direction as well since there is less friction. Whichever one of the two decoupled directions of travel is initially selected by the user, this is the direction that will provide a sense or feel to the user of a lower dynamic frictional force or frictional level. This then becomes the frictional drag that is sensed in order to continue with the selected direction of travel. Accordingly, it will be easier to continue moving the control handle in that preferred direction as compared to changing to the other direction. Any change to the other direction would then have to overcome the higher static friction in order to initiate movement.

The present inventors also considered the possibility of selectively increasing the friction for one direction of travel so that the other direction would be preferred, regardless of the static friction versus dynamic friction difference. For example, if it is preferred for the adjustment of the water flow rate to be easier, i.e., a lower frictional force, than the adjustment of the water temperature, i.e., a higher frictional force, then a fluid control valve could be designed accordingly. If this described situation is preferred, then the frictional drag that is added to the water temperature direction must be greater than the static/dynamic difference. In this way, even if the water temperature direction is selected and the lower dynamic friction is encountered, the added frictional drag will exceed this difference such that the water flow rate direction is still preferred. It was also envisioned by the present inventors that whatever mechanism would be used to vary the frictional force between the two directions of motion, that the frictional force level could be adjusted so that it could be specifically configured to each particular faucet and control valve configuration.

From the evaluation of existing technology by the present inventors, they conceived of the present invention as a novel an unobvious improvement to the current state of the art in the field of fluid control valves for water faucets. Specifically, the present invention utilizes a structural configuration with two separate orthogonal axes passing through a point with decoupled control of the movement about each axis. As an option, the frictional force about a selected axis can be selectively adjusted. What results is a type one style, joy stick motion, based on a modified ball and socket configuration, that includes temperature memory and a higher frictional force in the direction of water temperature adjustment in order to "prefer" motion in the direction of flow rate or volume adjustment.

While the preferred embodiment of the present invention is specifically directed to a fluid control valve for water delivery, and preferably for residential use, it is recognized that the specific mechanism selected to adjust the frictional force in one direction of motion so as to differentiate that direction from a second direction will have broader applicability in virtually any fluid control valve mechanism. While the present invention is described in the context of the preferred embodiment, it is to be noted that the applicable scope of the present invention is broader.

SUMMARY OF THE INVENTION

A fluid control valve for controlling both the temperature and flow rate of water from a faucet according to one embodiment of the present invention comprises a valve body assembly defining a plurality of fluid flow passageways, a housing assembly attached to the valve body assembly and defining therewith an interior space, and flow control means positioned within the interior space for controlling the flow of water by way of the plurality of fluid flow passageways, the flow control means including a movable spindle and being constructed and arranged for enabling movement of the spindle in a first direction about a first axis to control a first fluid flow parameter and in a second direction about a second axis to control a second fluid flow parameter, the first and second directions of movement being decoupled and the first and second axes being orthogonal axes.

One object of the present invention is to provide an improved fluid control valve.

Related objects and advantages of the present invention will be apparent from the following description.

DESCRIPTION OF THE PREFERRED EMBODIMENTS

Figure 1:
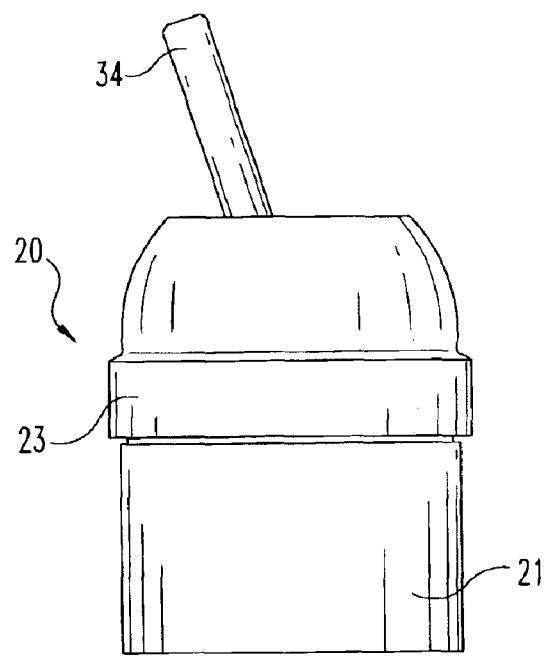
FIG. 1 is a front elevational view of a fluid control valve according to a typical embodiment of the present invention.
Figure 2:
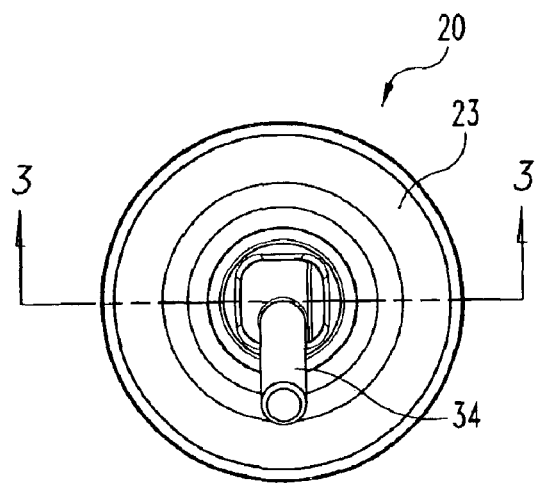
FIG. 2 is a top plan view of the FIG. 1 fluid control valve.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1–5, there is illustrated a fluid control valve 20 according to the present invention. Valve 20 includes as some of its primary structural component parts body 21, housing 22, and bonnet nut 23. These component parts are additionally illustrated in FIGS. 7 and 8. As illustrated, and as would be understood from a careful review of the specific structural features, a lower portion of housing 22 fits down into the hollow interior 24 of body 21 and an upper portion of housing 22 extends upwardly, above and free of body sidewall 25. The unitary body 21 includes an externally-threaded annular collar 26 and the internally-threaded annular skirt 27 of unitary bonnet nut 23 threadedly attaches to collar 26. This threaded engagement captures the radial flange 30 of housing 22 between body 21 and bonnet nut 23. In order to properly orient housing 22 within body 21 and to prevent any relative rotation or turning between the body 21 and the housing 22, a relief notch 31 is formed in collar 26 and a cooperating key tab 32 is formed as part of the radial flange 30.

The combination of the housing 22 and body 21 defines an interior space 33 that receives the remaining component parts that comprise valve 20. These remaining component parts constitute the primary component parts of the flow control mechanism utilized as part of fluid control valve 20. The only portions of the disclosed structure extending outside of interior space 33 are the control lever portion 34 of unitary spindle 35 and the ends of pivot pin 36. The interior components that comprise the remainder of valve 20, in addition to spindle 35 and pivot pin 36, include an inlet gasket 40, lower housing 41, lower disk seal 42, lower disk 43, upper disk 44, upper disk seal 45, upper disk support 46, pivot 47, drag spring 48, and washer plate 49. These components and the sequential axial stack of these components are further illustrated in the exploded views of FIGS. 7 and 8.

It will also be understood from the following description that the lower housing 41 and inlet gasket 40 are fixed in position relative to valve body 21 and in effect comprise a valve body assembly. Similarly, the combination of the bonnet nut 23 and housing 22, that are also fixed in position relative to body 21, can be thought of in terms of comprising a housing assembly, notwithstanding that housing 22 is assembled with the remaining components that are installed in body 21, as a subassembly, prior to bonnet nut 23 being threaded into position about collar 26. While the preferred embodiment of the present invention contemplates arranging the remaining components as a type of snap-together subassembly, at least one alternative is envisioned. This alternative is to assemble the referenced remaining components as a stack of individual parts that are not subassembled. If this alternative design is selected, then body 21 could be replaced by a faucet base or faucet housing with the required fluid openings or passageways. In this alternative design, inlet gasket 40 and lower housing 41 are not required.

Lower housing 41 defines three openings 41a, 41b, and 41c that are axially aligned with the three openings 43a, 43b, and 43c defined by lower disk 43. In order to seal around openings 41a–41c at the surface-to-surface interface between lower housing 41 and body 21, inlet gasket 40 is provided. In order to seal around openings 43a–43c at the surface-to-surface interface between lower disk 43 and upper disk 44, lower disk seal 42 is provided. For design simplicity and efficiency, the inlet gasket 40 is a unitary component, even though three separate gasket O-rings are used for the three openings 41a–41c. Similarly, for design simplicity and efficiency, the lower disk seal 42 is a unitary component, even though three separate gasket O-rings are used for the three openings 41a–41c and for the three openings 43a–43c.

Body 21 includes an annular sidewall 25 extending between base 54 and collar 26. Base 54 defines a pair of post recesses 55 and 56 and three flow openings. Flow openings 21a and 21b are illustrated, the third opening is not illustrated. However, the pattern and spacing of the three base openings coincide with the pattern and spacing of openings 41a–41c and of openings 43a–43c. Lower housing 41 includes a pair of upright arms 57 and 58 positioned on opposite sides of lower housing 41. Extending axially downwardly from the lower surface 59 of lower housing 41 is a pair of oppositely disposed posts 60 and 61. Posts 60 and 61 are constructed and arranged to fit into post recesses 55 and 56 as part of the assembly of lower housing 41 into body 21. Alignment and positioning of posts 60 and 61 into post recesses 55 and 56 properly positions and fixes lower housing 41 into body 21. As will be explained, upright arms 57 and 58 are constructed and arranged to snap into openings 100 of housing 22. If the alternative (non-subassembly) design is selected, then the arms 57 and 58 and the openings 100 would not be used and should be eliminated.

Figure 8:
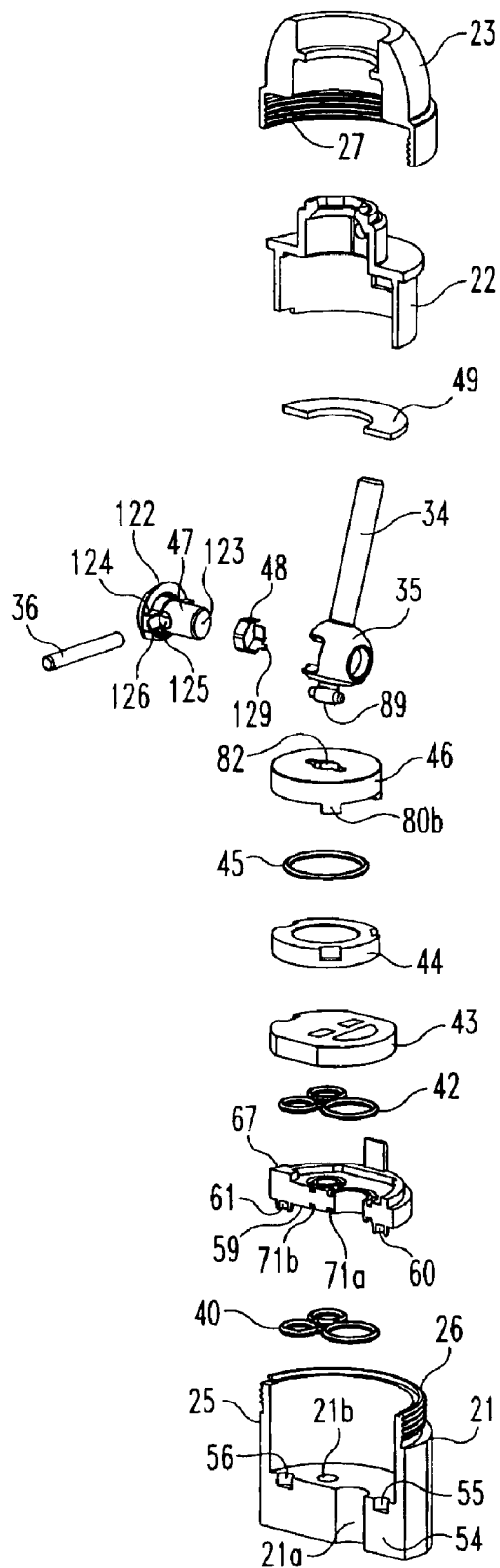
FIG. 8 is an exploded view in partial section of the component parts comprising the FIG. 1 fluid control valve according to the present invention.

Lower housing 41 includes a sidewall 65 that defines a receiving recess 66 and a radially inwardly directed keying tab 67. The uniquely shaped periphery of recess 66 is substantially the same as the peripheral shape of lower disk 43. Lower disk 43 also defines a tab recess 68 that is constructed and arranged to receive keying tab 67 when the lower disk 43 is assembled down into recess 66 of lower housing 41. As described, lower housing 41 is fixed in position relative to body 21. Similarly, lower disk 43 is fixed in position relative to lower housing 41. As for the inlet gasket 40 (a unitary set of three elastomeric O-rings), this is fixed radially relative to the lower housing 41 by means of three annular O-ring grooves defined by the lower surface 59 of lower housing 41. Portions of grooves 71a and 71b are illustrated in FIG. 8. The upper surface 72 of recess 66 defines three annular O-ring grooves 73a–73c for receipt of lower disk seal 42 (a unitary set of three elastomeric O-rings). The receipt of lower disk seal 42 in this manner ensures that the lower disk seal 42 is fixed radially relative to lower housing 41 and relative to lower disk 43 (see FIG. 8).

As would be recognized from a general understanding of single-lever control valves used for residential water faucets, for example, one incoming conduit or line is for the delivery of hot water, another incoming line is the delivery of cold water, and a third line is for the outflow of water, whether hot, cold or a blended mixture. These three lines correspond to the three openings 41a–41c in lower housing 41, the three flow openings in body 21 (21a and 21b being the only ones illustrated), and the three openings 43a–43c in lower disk 43.

In order to be able to control the flow rate and the temperature of the water flowing from the faucet or outlet that is controlled by fluid control valve 20, it is necessary to be able to vary the lateral or cross sectional flow area of the various openings from fully open to fully closed. This function is performed by the shape and positioning of the movable components of the fluid control valve 20, specifically the manner in which upper disk 44 slides across the upper surface of lower disk 43. The relationship between upper disk 44 and lower disk 43 is diagrammatically illustrated for four different flow and temperature combinations by FIGS. 9–12.

Figure 7:
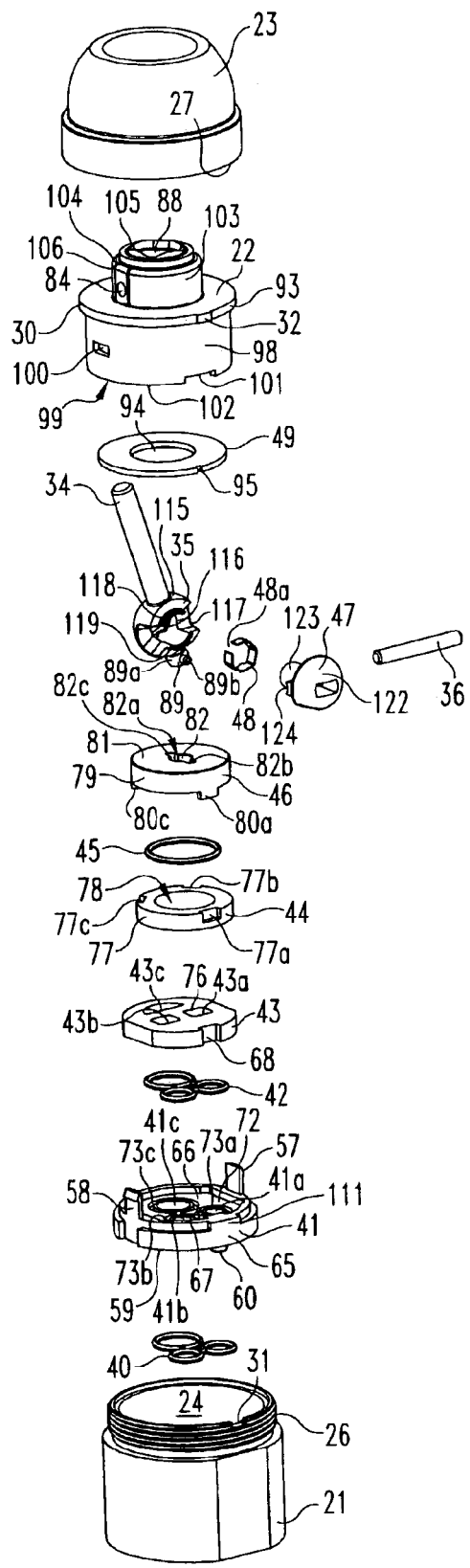
FIG. 7 is an exploded view in partial section of the component parts comprising the FIG. 1 fluid control valve according to the present invention.

With continued reference to FIGS. 7 and 8, upper disk 44 is a unitary, movable component that is constructed and arranged to move by sliding across the upper surface 76 of lower disk 43. The annular sidewall 77 defines a pattern of three relief notches 77a–77c, equally-spaced around the periphery of sidewall 77, and an interior region 78 that is uniquely contoured for flow management and control. The annular upper disk seal 45 (O-ring shape) is positioned between upper disk support 46 and upper disk 44 and is received with an O-ring groove defined by the upper disk support 46.

Upper disk support 46 includes a sidewall 79 that defines a pattern of three axially downwardly extending tabs that are constructed and arranged to fit within relief notches 77a–77c, respectively. Tabs 80a and 80c are illustrated, while tab 80b is hidden from view in FIG. 8. This interfit between upper disk support 46 and upper disk 44 means that these two components, as well as upper disk seal 45, move together as a single unit. The substantially flat upper surface 81 of upper disk support 46 defines a blind receiving recess 82 that is constructed and arranged to provide a support base for spindle 35. Recess 82 includes an enlarged center region 82a and outwardly extending open regions 82b and 82c, oppositely-disposed on opposite sides of the enlarged center region 82a.

Spindle 35 receives drag spring 48 and pivot 47 and this combination (referred to herein as the "spindle assembly" 83) creates a part-spherical control member that is captured by housing 22 and pinned in position within housing 22 by pivot pin 36. Housing 22 includes a pair of oppositely-disposed pin bores 84, each of which receive a free end of pivot pin 36. Housing 22 fits down over spindle assembly 83, allowing control lever portion 34 to extend through center opening 88. With the pivot portion 89 of spindle assembly 83 inserted into recess 82 and with the housing 22 positioned, the pivot pin 36 is pushed through one pin bore 84, through a bore aperture in the spindle assembly 83, and finally into the opposite pin bore 84. A sliding fit of pivot pin 36 is acceptable since bonnet nut 23 covers both free ends of the pivot pin 36, preventing any noticeable axial movement that might allow the pivot pin to come out of engagement with one of the two pin bores 84. Additionally, a close line-to-line or sliding fit of pivot pin 36 is desired so as to eliminate any backlash or hysteresis in the movement of spindle 35 as it changes direction of rotation about pivot pin 36. Pivot portion 89 has a shape generally coinciding with recess 82, including a larger diameter cylindrical portion 89a bounded by smaller diameter cylindrical portions 89b. All three portions 89a and 89b are coaxial with each other with a common axial centerline.

Washer plate 49 is constructed and arranged to fit up against the undersurface 92 of radial shelf 93 of housing 22. Washer plate 49 is a substantially flat, unitary member that defines a center opening 94 and an alignment notch 95. The washer plate 49 slides down over spindle assembly 83 and rests on the upper surface 81 of upper disk support 46. In this manner, the washer plate 49 defines the distance of axial separation between upper disk support 46 and housing 22.

Housing 22 further includes an annular sidewall 98 that defines the hollow interior 99. Sidewall 98 defines a pair of snap-fit openings 100 and an alignment notch 101 in lower edge 102. Radial shelf 93 is generally concentric with annular sidewall 98 and with upper portion 103 that defines center opening 88 and the pair of oppositely-disposed pin bores 84. Opening 88 is shaped and contoured in order to control and limit the range of motion and the available travel directions for the control lever portion 34 of spindle 35. With specific reference to upper portion 103, there is an annular lip or shelf 104 that separates the top 105 from the base 106. Depending on the component part tolerances, the interior annular lip 107 of bonnet nut 23 that is positioned adjacent shelf 104, may actually contact shelf 104 or may be spaced apart from shelf 104 when the bonnet nut 23 is threaded onto collar 26.

Upright arms 57 and 58 of lower housing 41 are each configured with a ratchet-like end 110 that is constructed and arranged to snap into a corresponding one of the two snap-fit openings 100 defined by sidewall 98. The ramped taper of each end 110 allows the corresponding upright arms 57 and 58 to deflect inwardly upon engagement by sidewall 98 until the snap-fit openings 100 are encountered. At this point, the arms 57 and 58 spring outwardly, allowing the undercut of the ramp to engage the lower surface of each opening 100 to thereby create a snap-fit assembly. Alignment notch 101 is constructed and arranged to receive tab 111 of lower body 41. This alignment feature ensures that the two upright arms 57 and 58 will be circumferentially aligned with the two snap-fit openings 100. The axial dimensions and relationships are such that notch-to-tab engagement begins before ends 110 encounter openings 100. As previously noted, if the non-subassembly alternative design is selected, arms 57 and 58 and openings 100 are not required.

Based upon the descriptions of the component parts of FIGS. 7 and 8, it should be clear that everything from the inlet gasket 40 at the bottom to housing 22 at the top can be manually assembled into a single, intact subassembly. Once assembled, with all components interfitting, snapped together, and pinned as described, this subassembly is able to drop down into the hollow interior 24 of body 21. Once in position, the remaining step is to thread the bonnet nut 23 onto collar 26 and tighten the bonnet nut in place.

The construction and subassembly details are further provided by FIGS. 1–6. While the selected cutting planes for the section views will not reveal every structural detail of every component part, FIGS. 7 and 8 make up any deficiencies in this respect. FIGS. 1–6 do clearly illustrate how the component parts are assembled and how they cooperate with each other for the construction of fluid control valve 20.

As discussed in the Background, single-handled control valves are typically constructed and arranged to enable two control functions, the flow rate from a maximum flow to being fully shut off and the desired water temperature. The movement and positioning of upper disk 44, via spindle 35, as well as the specific structure of upper disk 44 causes the three flow passageways, those defined in lower disk 43, lower housing 41, and valve body 21, to be open or closed in varying degrees and thereby dictate the state or condition of the fluid flow. In the context of this description, it will be noted that the three openings in body 21, lower housing 41, and lower disk 43 are all axially aligned such that they cooperate to define the three referenced flow passageways. Further, in describing the control function, it will be noted that when the outlet flow is fully open (i.e., not closed), the flow rate will be maximized. As far as the water temperature, the mix ratio of hot and cold water is controlled by the lateral cross sectional area of the corresponding passageways and the sliding position of upper disk 44 on lower disk 43. Closing off part of the cold water passageway causes a higher water temperature. A lower water temperature can be achieved by opening up the cold water passageway or by closing off a portion of the hot water passageway, or some of both. However, if a full flow rate is desired, opening up the incoming water passageways is preferred. The general functioning of a single-handled fluid control valve in this respect is believed to be well known. What sets the present invention apart from the prior designs is the construction and arrangement of the spindle assembly 83, the use of drag spring 48, and the sliding action of upper disk 44 across lower disk 43, noting that the sliding action occurs for both directions of movement. While there are a number of structural features associated with the overall design and construction of fluid control valve 20 that are believed to provide improvements in the fabrication of parts, assembly, and use, the construction and arrangement of drag spring 48 provides a novel and unobvious advance in the control, functioning, and "feel" of the spindle. The sliding action of upper disk 44 relative to lower disk 43 in both directions of movement is also considered to be a novel an unobvious advance in the art.

Considering the spindle assembly 83 as comprising spindle 35, drag spring 48, and pivot 47, it will be noted that the spindle 35 and pivot 47 assemble together with the drag spring 48 captured therebetween. More specifically, drag spring 48 is captured by spindle 35 and remains fixed within spindle 35 such that any relative motion of spindle 35 compared to pivot 47 includes corresponding motion of drag spring 48.

Spindle 35 includes the control lever portion 34 and integral therewith, as a unitary structure, ball portion 115 and pivot portion 89. The ball portion 115 defines a center bore 116 and, perpendicular to the center bore axis, a lateral channel 117. Two arc-shaped lips 118 and 119 are located on opposite sides of the bore axis and on opposite sides of the lateral channel 117. The axial centerline extending through cylindrical portions 89a and 89b is substantially parallel to the longitudinal axis of center bore 116. The longitudinal centerline of pivot pin 36 is substantially perpendicular to the axis of center bore 116 and is substantially perpendicular to the axial centerline of portions 89a and 89b. Due to the location of pivot pin 36 relative to the axis of center bore 116, it will be understood that the longitudinal axis of pivot pin 36 is orthogonal to the longitudinal axis of center bore 116 and these orthogonal axes intersect at a point.

Pivot 47 is a unitary structure that includes a part-spherical portion 122, cylindrical post 123, cross arms 124 and a pivot pin bore 125 defined by post 123. Cross arms 124 are each contoured with a curved undersurface 126 for clearance with pivot pin 36. In the assembly of pivot 47 into spindle 35, post 123 fits closely into center bore 116 and cross arms 124 fit into lateral channel 117. The only way to separate these two components is to pull apart the pivot 47 and spindle 35 in a direction along the longitudinal axis of post 123. In the final assembly, this type of movement is prevented by the enclosing and capturing nature of housing 21 (see FIGS. 3–5). The longitudinal axis of post 123 is substantially coincident with the longitudinal axis of center bore 116.

Figure 3:
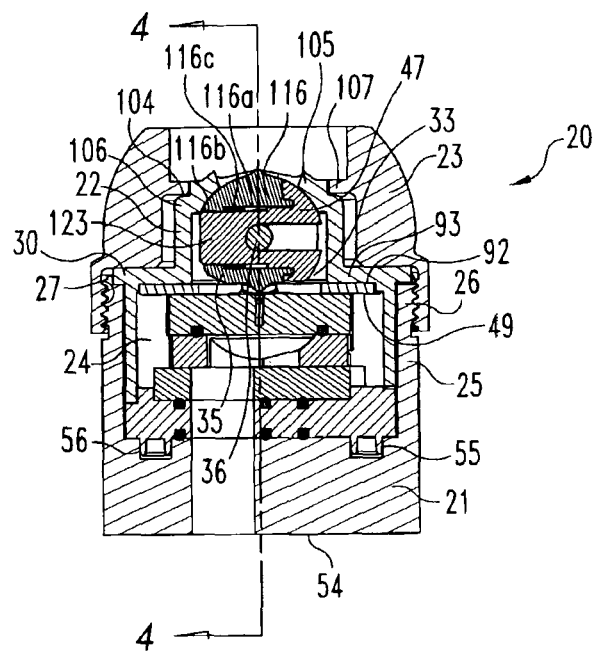
FIG. 3 is a front elevational view, in full section, of the FIG. 1 fluid control valve as viewed along line 3—3 in FIG. 2.
Figure 4:
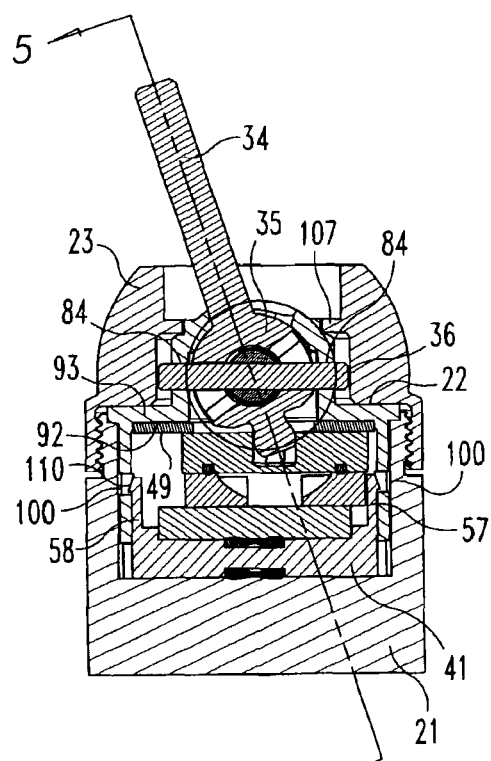
FIG. 4 is a front elevational view, in full section, of the FIG. 1 fluid control valve as viewed along line 4—4 in FIG. 3.
Figure 5:
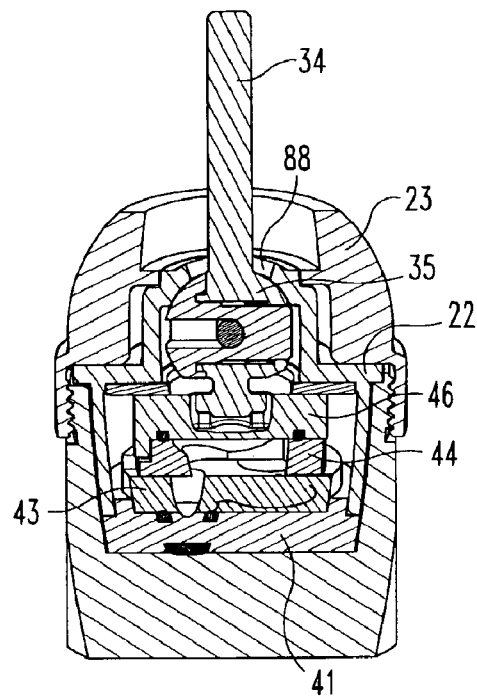
FIG. 5 is a front elevational view, in full section, of the FIG. 1 fluid control valve as viewed along line 5—5 in FIG. 4.
Figure 6:
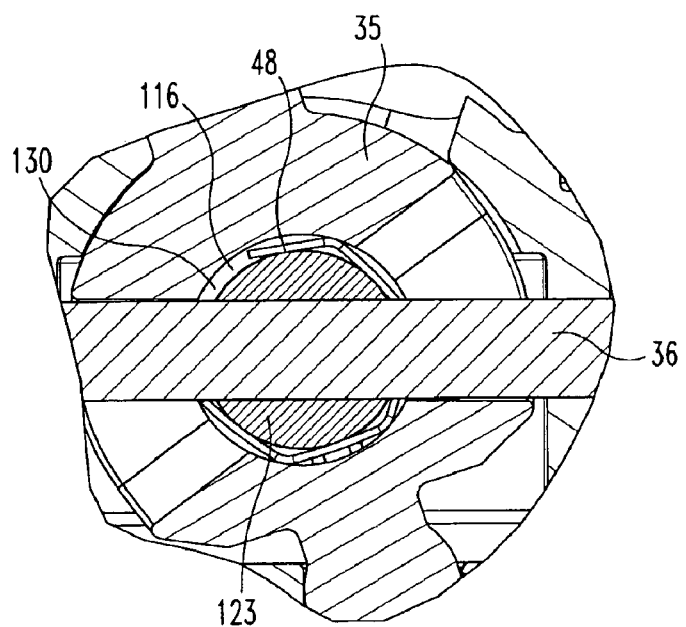
FIG. 6 is an enlarged detail of a portion of the FIG. 1 fluid control valve as illustrated in FIG. 4.

The positioning of drag spring 48 is best illustrated in FIGS. 3 and 4 and additionally by the enlarged detail of FIG. 6. As is illustrated, drag spring 48 is inserted down into the center bore 116 of ball portion 115. The center bore 116 includes a larger diameter first section 116a that is concentric with a smaller diameter section 116b. The interface between sections 116a and 116b defines an annular shoulder 116c. Drag spring 48 seats against shoulder 116c and is positioned between section 116a and cylindrical post 123. Post 123 has a line-to-line fit within section 116b. Pivot pin 36 is inserted at a location that places the pivot pin 36 across the end of drag spring 48, such that the drag spring 48 is positioned between the annular shoulder 116c and pivot pin 36, see FIGS. 3–6.

As would be clear from the assembly of the component parts as illustrated in FIGS. 3, 4, 7, and 8, for example, the control lever portion 34 is movable in a first direction about the axial centerline of cylindrical post 123. Movement of portion 34 in this direction is limited at the travel endpoints by the abutment of the edges of the lateral channel 117 with pivot pin 36. Since the axis of rotation (i.e., the centerline of post 123) is positioned between control lever portion 34 and pivot portion 89, movement of portion 34 results in movement of portion 89 in the opposite direction. This in turn enables the pivot portion 89 to move upper disk support 46 laterally in response to movement of control lever portion 34. As the upper disk portion 46, and in turn upper disk 44, moves with a sliding motion, the flow parameters of the water flowing from the corresponding faucet are changed or adjusted. In this mode of operation, the upper disk support 46 and specifically upper disk 44 moves across the upper surface of lower disk 43 with a sliding action. This lateral sliding motion varies the cross sectional areas of flow openings 43a and 43b. Since these two openings correspond to the hot water and cold water lines, this first direction of movement controls the water temperature.

Since the ends of pivot pin 36 are each received by housing 22, specifically by the pair of pin bores 84, the pivot 47 is fixed in position relative to housing 22 by way of pivot 36 when the control lever portion 34 is moved in the first direction. This enables rotational movement of spindle 35 relative to pivot 47 and positioned at the movement interface is drag spring 48. Unitary drag spring 48 includes a key way tab 129 that is received by a key way notch in spindle 35, specifically in the interior of ball portion 115 adjacent center bore 116. Whatever drag coefficient drag spring 48 creates at the movement interface between spindle 35 and pivot 47 influences the touch or feel of the movement of portion 34 when adjusting or changing the water temperature of the water that is delivered from the corresponding faucet.

The other (second) direction of movement permitted for control lever portion 34 is in a rotational direction about the axial centerline of pivot pin 36. It will be appreciated that the spindle assembly 83 is able to rotate as an integral unit about pivot pin 36. Since the axial centerline of pivot pin 36 is located between portion 34 and pivot portion 89, this means that movement of portion 34 in one direction results in movement of pivot portion 89 in the opposite direction. The positioning of pivot portion 89 into recess 82 of upper disk 46 translates movement of control lever portion 34 into sliding movement of upper disk 44 across the upper surface of lower disk 43. Movement of portion 34 in this second direction (i.e., rotational travel about pivot pin 36) is used to adjust the flow rate of the exiting flow of water between a full flow condition and a shut off (no flow) condition. The flow rate is adjusted by the degree that opening 43c is open or closed. Full flow is achieved when a majority of opening 43c is uncovered by upper disk 44, with at least a portion of either 43a or 43b uncovered. A shut off condition is achieved when upper disk 44 is moved so as to completely cover (i.e., close), openings 43a and 43b.

The two rotational directions of movement for spindle 35, the first about cylindrical post 123 and the second about pivot pin 36, are independent from each other, such that once the desired temperature is selected by movement of spindle 35 about cylindrical post 123, the flow can be adjusted without changing the selected temperature setting. This means that fluid control valve 20 includes a temperature memory capability by enabling water temperature to be independently adjusted relative to the flow rate and by the design of two independent spindle movements.

In the design of fluid control valves of the single-handled or single-lever style having a square pattern of movement (European-style), such as fluid control valve 20, one direction of movement controls the water temperature and another direction of movement, independent from the first, controls the fluid flow rate. As the user of the fluid control valve manually adjusts the water temperature and flow rate, it is possible to inadvertently move the joy stick lever in a direction other than that desired. For example, if the desired temperature has been selected and the flow rate is being adjusted, it is possible to inadvertently move the lever in the temperature direction, thereby changing what had previously been selected as the desired temperature. While this inadvertent change is less likely due to the independent directions of movement, it remains a possibility, particularly in view of the joy stick lever and the fact that it is capable of being moved in the two directions. To the extent that the frictional forces controlling the freedom of movement of the joy stick lever are the same in both directions, then there is no touch or feel while manipulating the joy stick lever that would enable the user to tell when the joy stick lever is moving in an undesired direction. The present invention addresses this issue by the use of drag spring 48.

Drag spring 48 has a generally hex design that is open at one corner. The two free ends are adjacent gap 48a. This gap or opening allows the remainder of the hex body to move and to flex as it is pressed into position in the ball portion 115 around center bore 116 and up against annular shoulder 116c. The press fit of drag spring 48 into center bore 116 causes a slight reduction in the size of the circle or cylinder that is defined by the pattern of tangential (midpoint) contact of each side of the hex design of drag spring 48. Consequently, when the cylindrical post 123 of pivot 47 is inserted into the defined interior opening of drag spring 48, an interference fit is created between the drag spring and the cylindrical post, creating a frictional force along each side of the hex design at its tangential point of contact with the outside diameter of cylindrical post 123.

Drag spring 48 is fabricated as a polygonal sleeve from one of a selection of metal alloys, including phosphor bronze and stainless steel, in order to provide a smooth running interface between drag spring 48 and cylindrical post 123. As illustrated, and as has been described, referring now to the enlarged detail of FIG. 6, drag spring 48 is positioned in annular space 130 and is positioned between the inside diameter of center bore 116 of spindle 35 and the outside diameter of cylindrical post 123. While the hex shape is selected as the preferred embodiment for drag spring 48 for the illustrated construction of fluid control valve 20, a range of polygonal shapes are possible, consistent with the theory of operation, depending on the various dimensions. The radial dimension or width of annular clearance space 130 is important and cooperates with the diameter size of post 123 to dictate the number of sides for the preferred polygonal shape of drag spring 48. The ends (corners) of each side (six total) of drag spring 48 are contacted by the inside diameter of bore 116 while the midpoint of each side of drag spring 48 contacts post 123 at a point of tangency. As would be understood from the trigonometry of the relationship between the inside diameter of bore 116 and the outside diameter of post 123, the length of each side of the drag spring 48, the outside diameter of post 123, and the radial width of annular space 130 dictate the number of polygon sides permitted for the drag spring if the described points of contact, ends, and midpoint contact of each side are maintained. As the inside diameter of bore 116 pushes on the ends of each side, i.e., the "corners" of the hex shape, the side is pushed against the outside diameter of post 123. The contact pressure of each hex side against the outside diameter of post 123 creates the drag on spindle 35 as it is moved to adjust the water temperature. The length of each side of the hex shape for drag spring 48 is also a design consideration, since the shorter the length, the "stiffer" the "beam".

Spindle assembly 83 includes spindle 35, pivot 47, and drag spring 48 and can be thought of as a "friction hinge" in the context of the present invention. An alternative friction hinge design is disclosed in U.S. patent application Ser. No. 10/400,300, filed Mar. 27, 2003, which patent application is hereby expressly incorporated by reference herein. Included as part of this alternative friction hinge design are design options for the drag spring 48. These design options include adding a friction tab to be bent inwardly or outwardly to add or increase the friction against the corresponding component (i.e., inwardly against pivot 47 or outwardly against spindle 35). Another design option is to change the location of the separation gap 48a from a hex "corner" to a hex side. Another design option is to bend the free ends that define the separation gap, either inwardly to contact pivot 47 or outwardly to contact spindle 35.

The fluid control valve 20 that is created by the structural arrangement of the disclosed component parts provides a device with a European-like square pattern of movement involving two independent axes of rotation. One direction controls the temperature of the water, while the other direction controls the flow rate. Since these rotational axes are independent of one another, valve 20 includes a temperature memory feature. Importantly, rotation of the lever portion about the two axes of rotation translates into sliding movement, in both directions, of upper disk 44 across the upper surface of lower disk 43. This in turn enables a smooth and precise control as part of fluid control valve 20 whether adjusting the water temperature or adjusting the flow rate. The use of drag spring 48 creates a higher frictional force in the temperature control direction and, comparatively, a freer movement in the flow rate direction.

With reference to FIGS. 9–12, the positioning of upper disk 44 relative to lower disk 43 for four different flow and temperature combinations (i.e., fluid control valve positions), is diagrammatically illustrated. Lower disk 43 includes three openings 43a, 43b, and 43c and upper disk 44 includes a single opening 44a. Opening 43a corresponds to the hot water line, opening 43b corresponds to the cold water line, and opening 43c corresponds to the flow outlet. Openings 43a–43c and opening 44a are shaped and contoured for the desired flow cross sectional geometry based upon the overlap of disk 44 on disk 43.

Figure 9:
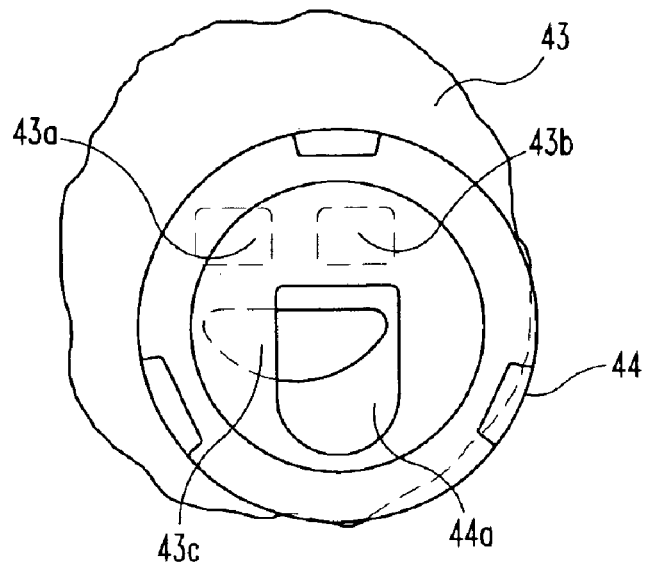
FIG. 9 is a diagrammatic top plan view of the relationship between movable and stationary disks comprising part of the FIG. 1 fluid control valve, in one flow and temperature position.
Figure 10:
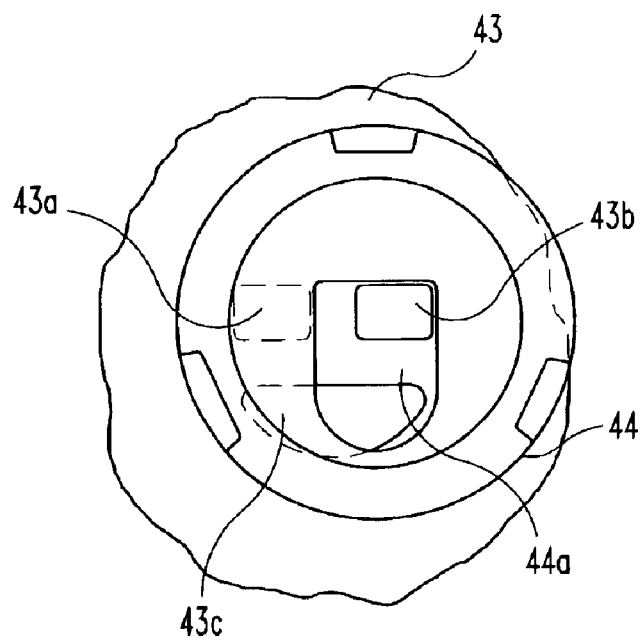
FIG. 10 is a diagrammatic top plan view of the relationship between movable and stationary disks comprising part of the FIG. 1 fluid control valve, in another flow and temperature position.

In the FIG. 9 arrangement of disks 43 and 44, there is no exiting flow because openings 43a and 43b are both covered (i.e., closed off) by the solid portion of disk 44 and by the position of disk 44 relative to disk 43. While opening 43c is not completely covered in this FIG. 9 orientation, neither hot nor cold water is able to flow from openings 43a and 43b in order to reach outlet opening 43c. Movement of disk 44 in a "forward" direction in order to change the configuration from the FIG. 9 arrangement to the FIG. 10 arrangement results in a full on-full cold condition. Opening 44a overlaps opening 43b and a majority of opening 43c. With opening 43b completely uncovered, there is a maximum flow of cold water. The uncovered cross sectional area of opening 43c is at least as large as opening 43b so the fluid control valve is considered to be in a "full on" condition.

Figure 11:
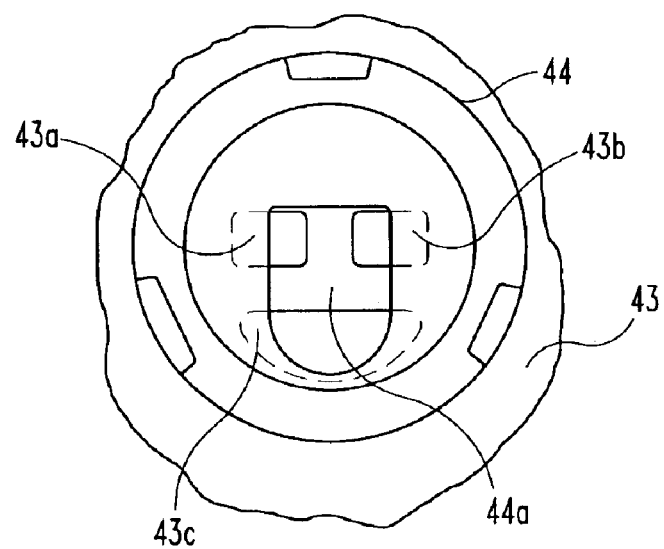
FIG. 11 is a diagrammatic top plan view of the relationship between movable and stationary disks comprising part of the FIG. 1 fluid control valve, in another flow and temperature position.

Referring to FIG. 11, the position of disk 44 relative to disk 43 creates a condition described as "full on-middle" because the uncovered areas of openings 43a and 43b are equal in order to balance the mix of hot and cold water.

Figure 12:
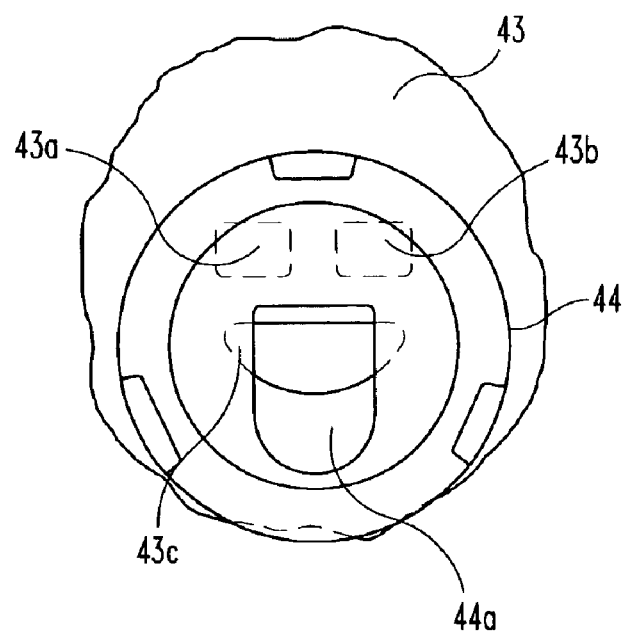
FIG. 12 is a diagrammatic top plan view of the relationship between movable and stationary disks comprising part of the FIG. 1 fluid control valve, in another flow and temperature position.

Referring to FIG. 12, the position of disk 44 relative to disk 43 creates a condition described as "full off-middle" because openings 43a and 43b are both completely covered and disk 44 is centered on disk 43.

A review of FIGS. 9–12 and the described flow and temperature conditions should make it clear how all flow and temperature combinations can be achieved. Additionally, the specific shaping of all four openings 43a–43c and 44a is done in order to try and achieve some degree of "linearity" in the flow rate relative to the movement of disk 44. The same desire for linearity applies to the temperature setting. As disk 44 is moved, the same increment of travel within the range of available motion should result in approximately the same degree of temperature change or flow rate change.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid control valve comprising:
   a valve body assembly defining a plurality of fluid flow passageways;
   a housing assembly attached to said valve body assembly and defining therewith an interior space; and
   flow control means positioned within said interior space for controlling the flow of fluid via said plurality of fluid flow passageways, said flow control means including a movable spindle and said flow control means being constructed and arranged for enabling movement of said spindle in a first direction by rotation about a first axis to control a first fluid flow parameter and in a second direction by rotation about a second axis to control a second fluid flow parameter, said first and second directions of movement being distinct from each other and said first and second axes being orthogonal axes to each other.

2. The fluid control valve of claim 1 wherein said first and said second orthogonal axes intersect at a geometric point location.

3. The fluid control valve of claim 2 wherein said flow control means is constructed and arranged as a modified ball and socket arrangement.

4. The fluid control valve of claim 3 wherein said movable spindle is constructed and arranged to provide a modified ball component for said modified ball and socket arrangement.

5. The fluid control valve of claim 4 wherein said geometric point location is within said modified ball component.

6. The fluid control valve of claim 5 wherein said first fluid flow parameter is the temperature of the fluid.

7. The fluid control valve of claim 6 wherein said second fluid flow parameter is the flow rate of the fluid.

8. The fluid control valve of claim 7 wherein said valve body assembly includes a stationary surface defining one end of each fluid flow passageway of said plurality of fluid flow passageways.

9. The fluid control valve of claim 8 wherein said flow control means includes a movable disk that is positioned on said stationary surface and is constructed and arranged for movement across said stationary surface.

10. The fluid control valve of claim 9 wherein said movable disk is constructed and arranged for movement in a sliding motion across said stationary surface in a first control direction in response to movement of said movable spindle in said first direction.

11. The fluid control valve of claim 10 wherein said movable disk is constructed and arranged for movement in a sliding motion across said stationary surface in a second control direction in response to movement of said movable spindle in said second direction.

12. The fluid control valve of claim 1 wherein said first fluid flow parameter is the temperature of the fluid.

13. The fluid control valve of claim 12 wherein said second fluid flow parameter is the flow rate of the fluid.

14. A fluid control valve comprising:
   a valve body assembly defining a plurality of fluid flow passageways;
   a housing assembly attached to said valve body assembly and defining therewith an interior space; and
   flow control means positioned within said interior space for controlling the flow of fluid via said plurality of fluid flow passageways, said flow control means including a movable spindle and said flow control means being constructed and arranged for enabling movement of said spindle in a first direction by rotation about a first axis to control a first fluid flow parameter and in a second direction by rotation about a second axis to control a second fluid flow parameter, said first and second directions of movement being distinct from each other and said flow control means including a frictional drag component constructed and arranged to add a frictional drag force to said spindle in one of said first and second directions of movement.

15. The fluid control valve of claim 14 wherein said frictional drag component is a polygonal-shaped sleeve.

16. The fluid control valve of claim 15 wherein said polygonal-shaped sleeve having a pair of peripheral free ends that are spaced apart to define a peripheral gap.

17. The fluid control valve of claim 16 wherein said first fluid flow parameter is the temperature of the fluid.

18. The fluid control valve of claim 17 wherein said second fluid flow parameter is the flow rate of the fluid.

19. The fluid control valve of claim 18 wherein said valve body assembly includes a stationary surface defining one end of each fluid flow passageway of said plurality of fluid flow passageways.

20. The fluid control valve of claim 19 wherein said flow control means includes a movable disk that is positioned on said stationary surface and is constructed and arranged for movement across said stationary surface.

21. The fluid control valve of claim 20 wherein said movable disk is constructed and arranged for movement in a sliding motion across said stationary surface in a first control direction in response to movement of said movable spindle in said first direction.

22. The fluid control valve of claim 21 wherein said movable disk is constructed and arranged for movement in a sliding motion across said stationary surface in a second control direction in response to movement of said movable spindle in said second direction.

23. The fluid control valve of claim 14 wherein said first fluid flow parameter is the temperature of the fluid.

24. The fluid control valve of claim 23 wherein said second fluid flow parameter is the flow rate of the fluid.

25. The fluid control valve of claim 14 wherein said valve body assembly includes a stationary surface defining one end of each fluid flow passageway of said plurality of fluid flow passageways.

26. The fluid control valve of claim 25 wherein said flow control means includes a movable disk that is positioned on said stationary surface and is constructed and arranged for movement across said stationary surface.

27. The fluid control valve of claim 26 wherein said movable disk is constructed and arranged for movement in a sliding motion across said stationary surface in a first control direction in response to movement of said movable spindle in said first direction.

28. The fluid control valve of claim 27 wherein said movable disk is constructed and arranged for movement in a sliding motion across said stationary surface in a second control direction in response to movement of said movable spindle in said second direction.

29. The fluid control valve of claim 28 wherein said first control direction is perpendicular to said second control direction.

30. A fluid control valve comprising:

an enclosure assembly defining a plurality of fluid flow passages and an interior space;

flow control means positioned within said interior space for controlling the flow of fluid via said plurality of fluid flow passages, said flow control means including a movable spindle and said flow control means being constructed and arranged for enabling movement of said spindle in a first direction by rotation about a first axis to control a first fluid flow parameter and in a second direction by rotation about a second axis to control a second fluid flow parameter, said first and second directions of movement being distinct from each other and said first and second axes being orthogonal axes to each other; and a pivot pin extending through said flow control means, said pivot pin having an axial centerline and an end portion received by said enclosure assembly, said axial centerline corresponding to one of said first and second axes.

31. A fluid control valve comprising:

an enclosure assembly defining a plurality of fluid flow passages and an interior space; and flow control means positioned within said interior space for controlling the flow of fluid via said plurality of fluid flow passages, said flow control means including a movable spindle and said flow control means being constructed and arranged for enabling movement of said spindle in a first direction by rotation about a first axis to control a first fluid flow parameter and in a second direction by rotation about a second axis to control a second fluid flow parameter, said first and second directions of movement being distinct from each other and said flow control means including a frictional drag component constructed and arranged to add a frictional drag force to said spindle in one of said first and second directions of movement.

32. A fluid control valve comprising:

an enclosure assembly defining a plurality of fluid flow passages and an interior space; and flow control means positioned within said interior space for controlling the flow of fluid via said plurality of fluid flow passages, said flow control means including a movable spindle and said flow control means being constructed and arranged for enabling movement of said spindle in a first direction by rotation about a first axis to control a first fluid flow parameter and in a second direction by rotation about a second axis to control a second fluid flow parameter, said first and second directions of movement being distinct from each other and said first and second axes being orthogonal axes to each other, said flow control means further including a pivot member received by said spindle, said pivot member having an axial centerline, said axial centerline corresponding to one of said first and second axes.

33. The fluid control valve of claim 32 further including a pivot pin received by said pivot member, said pivot pin having an axial centerline that corresponds to the other of said first and second axes.

* * * * *